E. C. POOL.
AUTOMATIC ELECTRIC SCALE.
APPLICATION FILED JULY 5, 1916.

1,356,009.

Patented Oct. 19, 1920.
4 SHEETS—SHEET 1.

Fig. 1.

WITNESSES:
D. C. Walter
C. J. Zinke

INVENTOR.
Elmer C. Pool
by George R. Frye
ATTORNEY

E. C. POOL.
AUTOMATIC ELECTRIC SCALE.
APPLICATION FILED JULY 5, 1916.

1,356,009.

Patented Oct. 19, 1920.
4 SHEETS—SHEET 3.

WITNESSES:
C. J. Zinke

INVENTOR.
Elmer C. Pool
by George R. Frye
ATTORNEY

E. C. POOL.
AUTOMATIC ELECTRIC SCALE.
APPLICATION FILED JULY 5, 1916.

1,356,009.

Patented Oct. 19, 1920.
4 SHEETS—SHEET 4.

INVENTOR.
Elmer C. Pool
by George R. Frye
ATTORNEY

UNITED STATES PATENT OFFICE.

ELMER C. POOL, OF NEW CASTLE, PENNSYLVANIA, ASSIGNOR TO TOLEDO SCALE COMPANY, OF TOLEDO, OHIO, A CORPORATION OF NEW JERSEY.

AUTOMATIC ELECTRIC SCALE.

1,356,009.  Specification of Letters Patent.  Patented Oct. 19, 1920.

Application filed July 5, 1916. Serial No. 107,592.

*To all whom it may concern:*

Be it known that I, ELMER C. POOL, a citizen of the United States, residing at New Castle, in the county of Lawrence and State of Pennsylvania, have invented certain new and useful Improvements in Automatic Electric Scales, of which the following is a specification.

This invention relates to improvements in automatic weighing scales, and more particularly to that class of scales known as pendulum scales.

Among the objects of this invention are the improvement of pendulum weighing mechanisms, the provision of automatic means for depositing counterpoise weights upon the weighing mechanism when the weighing capacity of the pendulum is exceeded, the arrangement of separately-movable printing mechanisms actuated respectively from the pendulum and the weight-depositing mechanism in juxtaposition for convenient coöperation, the provision of indicating means using large clear figures movable into reading position behind a conveniently-located sight opening, and electric actuating means so connected and arranged as to automatically operate the various mechanisms.

Other objects and advantages will readily appear from the following description, in which reference is had to the accompanying drawings illustrating one embodiment of my invention by way of exemplification, and wherein similar reference numerals designate similar parts throughout the several views.

In the drawings, the base 5 carries adjacent its rear end a suitable framework 4 supporting the various mechanisms presently to be described, and adjacent its forward extremity base horns 6 which suitably support the platform-supporting lever 7 which, as herein shown, is fulcrumed adjacent one extremity upon the base horns 6 and connected at its other extremity to the link 8. The platform or goods-receiver 9 comprises a platter of glass, or other suitable material, resting upon a spider 10 which is supported upon upwardly-extending pivots carried by the lever 7 in the usual manner. A dash pot 11 is suitably connected to the lever 7 to prevent undue oscillation of the lever and connected mechanism in the weighing operations of the scale.

Figure 1:
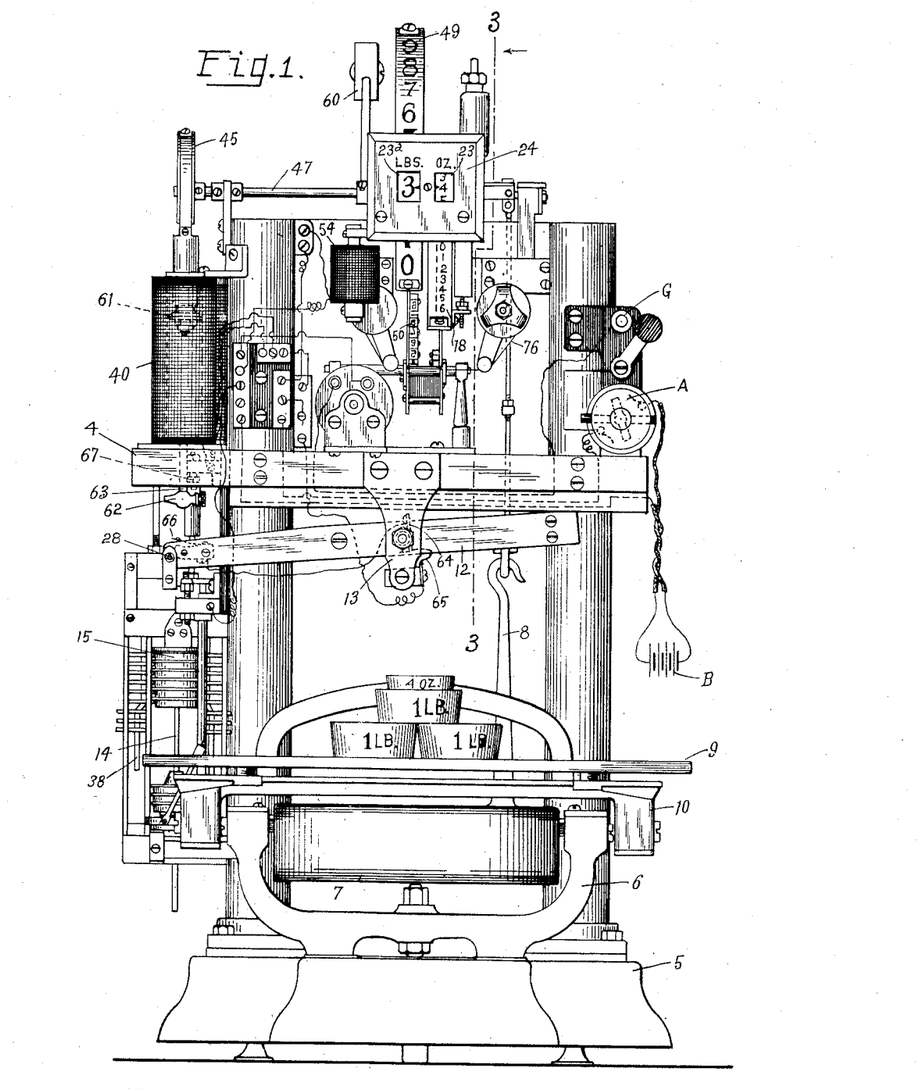
Figure 1 is a front elevation of a scale embodying my invention.
Figure 2:
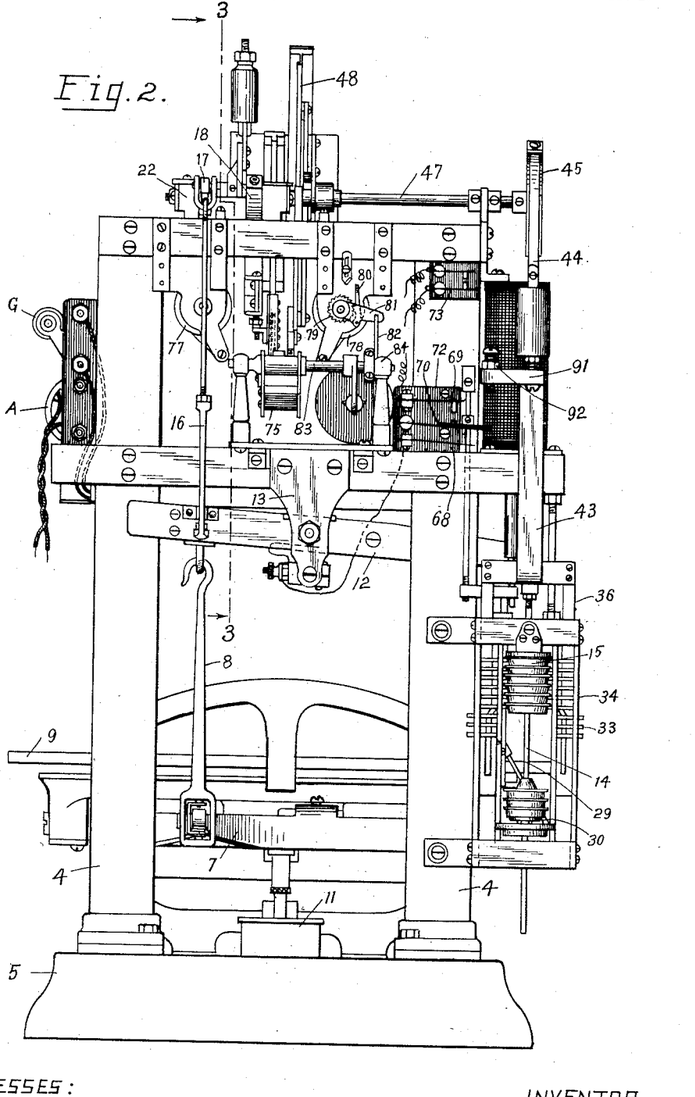
Fig. 2 is a rear elevation thereof.
Figure 3:
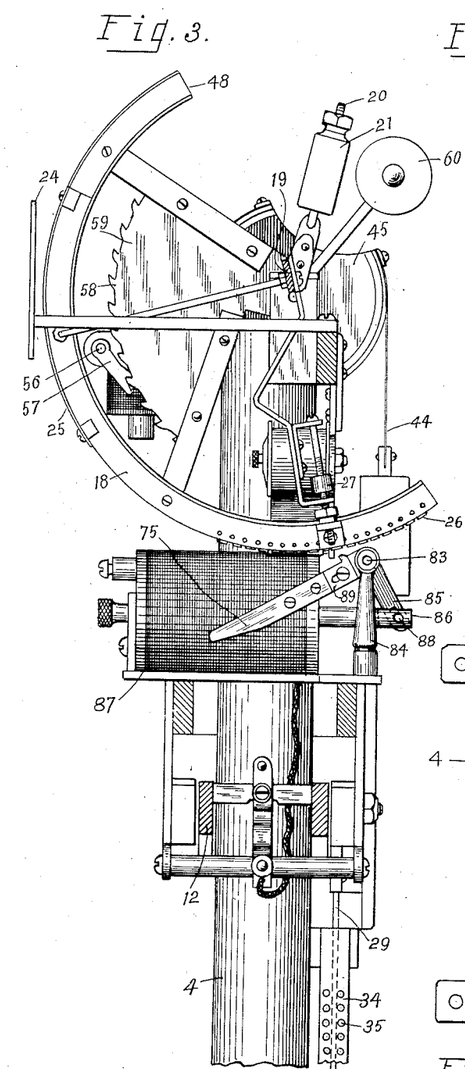
Fig. 3 is an enlarged detail sectional view taken substantially on the line 3—3 of Figs. 1 and 2.

The link 8 is connected at its upper end to one arm of the scale beam 12 suitably pivoted intermediate its ends upon brackets 13 carried by the framework of the scale, the other arm of the scale beam carrying the hanging counterpoise 14 above which is normally suspended the series of detachable counterpoise weights 15. The scale beam 12 is also connected (see Figs. 2 and 9) by means of an adjustable link 16 with the arm 17 of the pendulum 18, which pendulum is formed of a segmental frame fixed upon an elongated bearing 19 and carrying a series of spaced indicating numerals and also a series of spaced printing type, for purposes to be hereinafter more fully described. The bearing 19 comprises an elongated bar having knife edges at its opposite ends resting in bearings 22 (see Fig. 2) and has fixed thereto the arm 17, the segment 18 and the threaded adjusting post 20, which is adapted to receive the counterbalancing weight 21 for normally weighting and balancing the segmental pendulum 18 in its desired position. The link 16 and pendulum mechanism are so connected with the scale beam 9 that the full travel of the pendulum may be had without moving the hanging counterpoise 14 on the opposite arm of the scale beam into contact with any of the suspended counterpoise weights 15, thereby enabling the utilization of the pendulum counterbalance to its utmost capacity before using the detachable counterpoise weights 15. Suitable means may be employed for indicating the weight offset by the pendulum 18. As herein shown, the weight offset by the pendulum at any raised position is indicated at the sight opening 23 in the indication plate 24, as shown in Fig. 1, a strip 25 bearing a series of spaced indications being positioned upon the periphery of the segmental pendulum 18 so as to bring the numeral indicating the weight then offset by the pendulum into alinement with this sight opening. A series of spaced type 26 is also secured to the pendulum 18, substantially as shown in Fig. 3, the arrangement being such that each particular type is brought into position for printing as the pendulum is moved to a position offsetting an amount of weight corresponding to the numeral on the type. Means may also be provided for suitably weighting the pendulum adjacent the periphery thereof (see Fig. 9), as for example, by adjusting the weight 27 toward or away from the periphery of the segment. By suitably increasing or diminishing the weight of the segment 18 and adjusting the weight 27 and the counterbalancing weight 21 to various positions, the pendulum may be adjusted to offset any desired weight. In the illustrated embodiment, the pendulum is utilized to offset the weight of a load of 1 lb. when placed on the platform 9, and the indication strip 25 bears numerals indicating ounces of weight. It is to be understood, however, that this is merely for purposes of illustration and that the pendulum 18 can be increased in size and capacity so as to offset any desired weight.

Figures 4, 5, 6:
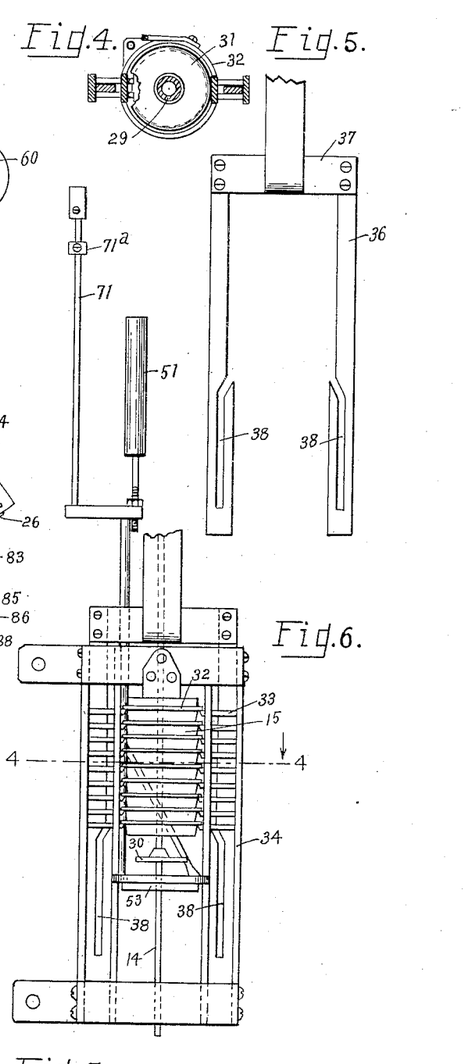
Fig. 4 is a detail section taken substantially on the line 4—4 of Fig. 6.
Fig. 5 is a detail elevation of a portion of the weight-depositing mechanism.
Fig. 6 is a detail view of the weight-depositing mechanism with the weights in normal suspended position.
Figure 7:
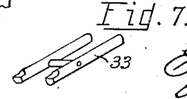
Fig. 7 is a detail perspective view of an element of the weight-suspending mechanism.

The hanging counterpoise 14 is suspended from knife edge pivots 28 (Fig. 1) upon the scale beam 12 and comprises a stem 29 supporting a pan 30 in position to successively receive the detachable counterpoise weights 15, which are normally suspended a sufficient distance above the pan to enable the full travel of the beam and pan without contacting the suspended weights. Each of the weights 15 comprises an apertured disk 31 surrounding the stem 29 (Figs. 4 and 6) and having a peripheral flange 32 adapted to rest upon the innermost extremities of H-shaped supporting links 33 (Fig. 7). The supporting links 33 are slidably mounted in parallel uprights 34 suitably supported upon the framework 4 of the scale, as shown in Fig. 2, and are guided in their sliding movements by alined apertures 35 formed therein (Fig. 8), the arrangement being such that the supporting links are disposed in pairs on the same horizontal plane, each pair supporting one of the detachable weights 15. Between the parallel uprights 34 on each side of the series of weights are arranged a pair of vertically-movable cam-rods 36 connected at their upper extremities by a strut 37, substantially as shown in Fig. 5. Each cam-rod 36 fits between the outermost of the parallel uprights 34 and the crossbars of the H-shaped supporting links 33, and the mouth of the cam-shaped slots 38 extends inwardly a sufficient distance to engage the opposite side of the crossbar of each link as the cam-rods 36 move upwardly from the position shown in Fig. 6, the crossbars of the links 33 being then forced outwardly by the incline of the slots 38 so as to separate the links of each horizontally-disposed pair successively, thereby releasing the weights 15 previously supported by said links. Similarly, as the cam-rods 36 move downwardly, the crossbars of the links 33 are successively brought into engagement with the inclined portions of the slots 38 and the links are successively forced inwardly into position to again engage the lower edge of the flanges 32 of the weights, the inner walls of the cam-rods 36 above the mouths of the slots 38 engaging the cross bars so as to maintain them in this position.

Figures 8, 9, 10:
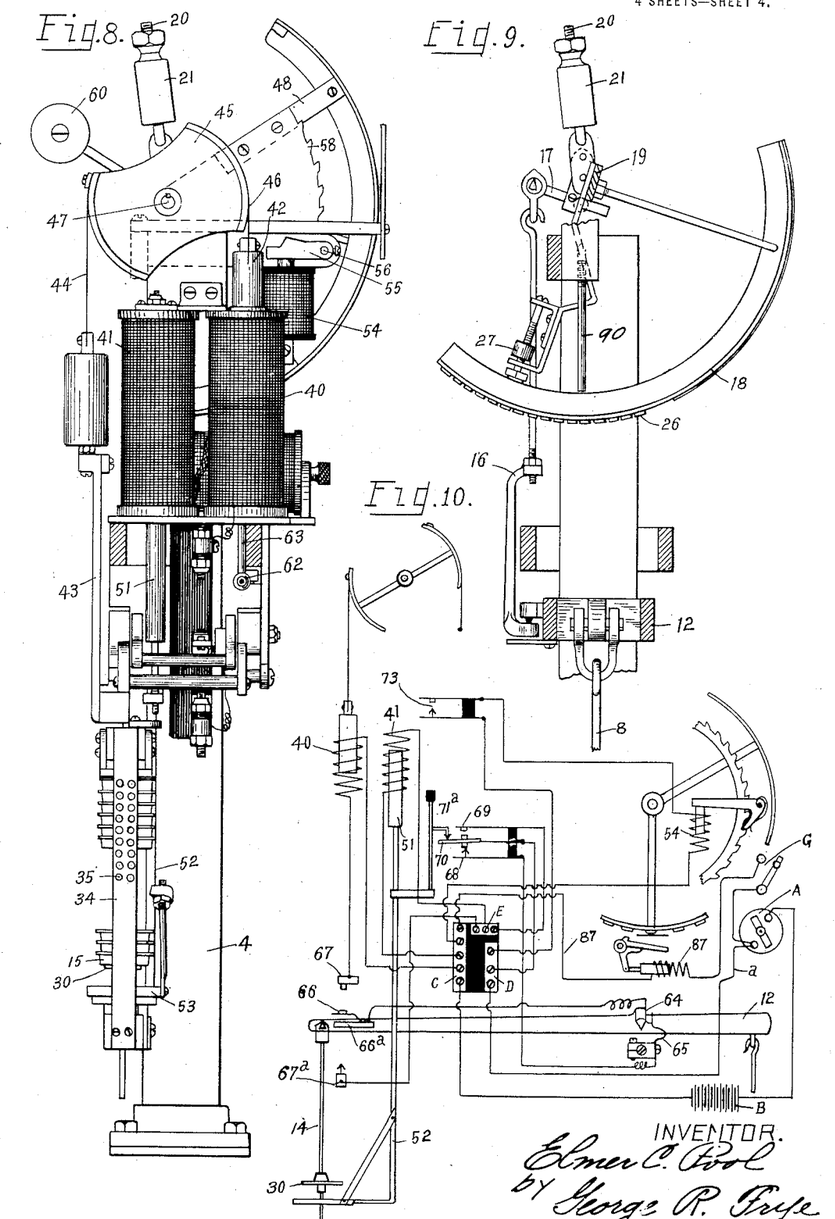
Fig. 8 is a side elevation of the rear portion of the scale, looking from the left in Fig. 1.
Fig. 9 is a detail view showing the pendulum weighing mechanism in elevation and the scale beam and supporting framework in section.
Fig. 10 is a diagrammatic view of the wiring circuits and connections.

Means are herein provided whereby electrically-actuated mechanisms automatically controlled by the movements of the scale beam serve to successively deposit the weights 15 upon the counterpoise pan as needed to offset the weight of a load upon the platform, to indicate in convenient reading position the weight of the load offset by the deposited weights, and to return the weights to their normal positions after the load is removed from the platform. In the illustrated embodiment I employ a pair of solenoid coils 40 and 41 vertically disposed above the suspended series of weights and slightly spaced from each other, substantially as shown in Fig. 8. The cam-rods 36 are suitably connected with the core 42 of the foremost solenoid 40, this connection being through the link 43, weighted ribbon 44, segment 45, and ribbon 46 (see Fig. 8). The segment 45 is suitably keyed upon the shaft 47 and the ribbons 44 and 46 are secured to the periphery thereof in any suitable manner. The energization of the solenoid 40 will serve to draw the core 42 downwardly and thereby rock the segment 45 to elevate the cam-rods 36 to bring the cam slots 38 thereof into successive contacts with the links 33 to move the links into position to release the detachable weights 15. The rocking of the segment 45 also rocks the shaft 47, which is suitably mounted upon brackets carried by the framework 4 and carries the segmental weight indicating and type-bearing segment 48 directly behind the sight opening 23ª in the indicating plate 24. The weight indications are marked on the strip 49 secured on the periphery of the segment 48, substantially as shown in Fig. 1, and are so positioned and arranged that the numerals are brought into alinement with the opening 23ª in accordance with the depositing of the weights 15. The series of printing type 50 are also secured upon the segment 48 and are moved into printing position in accordance with the depositing of the weights 15. A suitable adjustable counterbalance weight 60 may be arranged upon an arm fixed upon the shaft 47 (see Fig. 1) to normally counterbalance the weight of the segment 48 and the elements carried thereby.

To return the weights 15 to their normal positions the solenoid 41 is energized. The core 51 of this solenoid is connected with the carrier 52, the pan 53 of which is arranged directly below the counterpoise 14 and the suspended weights (see Fig. 8) and is guided in its up and down movements by the innermost of the parallel arms 34. The pan 53 comprises a ring having a central aperture of sufficient diameter to clear the counterpoise pan 30. In its upward movement the pan 53 engages the lowermost weight 15 upon the counterpoise pan and lifts the weights from the counterpoise pan to their original positions, retaining them in this raised position until their supporting links 33 have been returned to their normal positions supporting the several weights, as will be hereinafter described.

When the core 51 of the solenoid 41 approaches the limit of its upward movement, an upright arm 71 carried thereby comes into contact with the lower movable member of a switch 73 mounted adjacent the top of the framework 4 (Fig. 2) and a circuit is closed through a solenoid 54 supported upon the framework of the scale adjacent the segment 48 (see Fig. 1). The core of this solenoid is connected with a crank-arm 55 (Fig. 8) fixed on a shaft 56 mounted on the framework of the scale, said shaft also having fixed thereto a pawl 57 (Fig. 3) adapted to be normally held by a light spring in engagement with the ratchet teeth 58 on the segment 59 suitably fixed upon the skeleton frame of the segment 48. The shape and disposition of the ratchet teeth 58 relatively to the pawl 57 are such as to allow the segment 48 to freely rock downwardly as the weights 15 are deposited on the pan 30, the pawl 57 then engaging the adjacent ratchet tooth to prevent the immediate return of the segment 48 and the weight-depositing mechanism to its normal position, locking the segment in position presenting the weight indication corresponding to the capacity of the weights deposited behind the sight opening 23ª and the corresponding printing type above the printing hammer. The energization of the solenoid 54 retracts its core and rocks the shaft 56 to swing the pawl 57 out of engagement with the ratchet teeth 58, thereby freeing the segment 48 to allow it to rotate with the shaft 47 during the movements of the segment 45 in returning the weight-depositing mechanism to its normal position, the elevated cam-rods 36 and weighted ribbon 44 (Fig. 8) falling to their original positions by their own weight and rocking the segment 45, shaft 47, and segment 48 during their downward travel.

To dampen the movement of the core 42 of the solenoid 40 and prevent the too rapid operation of the weight-depositing mechanism, a suitable damping device may be employed. As herein shown, the core 42 carries a piston 61 (shown in dotted lines in Fig. 1) fitting snugly within a vertical cylinder mounted centrally of the solenoid 40. The cylinder may contain glycerin, oil, or other liquid, or may contain a gaseous fluid, such as air. In the illustrated embodiment an air dash pot is shown, the inlet and outlet of the air being controlled by a valve 62 connected with the base of the cylinder by a pipe 63. (Figs. 1 and 8.)

The herein illustrated mechanism for printing the weights of commodities placed upon the platform comprises a platen or hammer 75 (Fig. 3) placed below the printing type carried by the segments 18 and 48 and of sufficient width to present a firm bed below each of these series of type. An ink bearing ribbon 76 passes below both series of printing type and above the hammer 75, being preferably carried upon a roller 77 mounted in brackets upon the framework of the scale and winding onto a similar roller 78 (see Fig. 2), any suitable means being utilized to advance the inking ribbon with each impression of the printing mechanism. As herein shown, a ratchet wheel 79 fixed onto the shaft carrying the roller 78 co-acts with a pivoted pawl 80 mounted on the arm 81 which is connected, as by the link 82, with the mechanism for rocking the printing hammer 75. The printing hammer is preferably pivoted upon a shaft 83 mounted in brackets 84 (Fig. 3), to which shaft is also fixed a depending arm 85 loosely connected with the core 86 of a solenoid 87, the preferred connection being a wrist pin 88 movable in a slot formed in the arm 85. Whenever the solenoid 87 is energized its core 86 will be retracted, swinging the depending arm 85 to rock the shaft 83 and printing hammer 75 to bring the upper surface of the hammer forcibly into contact with the inking ribbon 76 and the printing type on the segments 18 and 48. In practice, a card or the like is placed upon the upper surface of the printing hammer prior to the energization of the solenoid 87, which card receives the imprint of the type on the segments through the printing ribbon. A suitable guide, as the adjustable plate 89, (Fig. 3) may be provided for positioning the card upon the printing hammer.

Any desired means may be utilized for relieving the segments 18 and 48 from the shock due to the impact of the printing hammer 75 thereon, the segment 18 particularly needing some means for taking up the shock because of the fact that it is mounted upon sensitive knife-edge pivots. As herein shown, a depending post 90 is adjustably mounted in the framework of the scale immediately above the segments and is so positioned and adjusted that the lower extremity of the post is very close to the inner periphery of each segment so that a very slight upward movement of the segment will bring the inner periphery into contact with the post 90 to be re-inforced thereby. This upward movement of the segment is made as slight as possible, while providing clearance for the segments in their rocking movements.

The electrical equipment for actuating the various mechanisms hereinbefore described is preferably arranged and connected substantially as illustrated in diagrammatic form in Fig. 10. A main switch A is arranged in convenient position so that the operator may at will connect the scale with a battery B or other source of current supply, one wire from the battery leading to the switch A and the other wire to the contact plate C arranged upon a suitable insulating block and carrying a series of screw contacts. From the switch A a wire $a$ leads directly to a similar contact plate D mounted on the same insulating plate, the wires leading from the plate D being hereinafter considered as directly connected with the switch A. A third contact plate E is also arranged upon the same insulating plate and carries a series of contact screws connecting with wires leading to various solenoids and switches, as hereinafter described. The scale beam 12 carries a projection 64 at its fulcrum pivot (shown in dotted lines in Fig. 1), said projection contacting with a leaf spring contact 65 mounted on the bracket 13 supporting the beam 12 so that the projection 64 remains in close contact with the leaf spring 65 at all positions of the former. The projection 64 (see Figs. 1 and 10) is electrically connected with an upper beam contact 66 which is adapted to engage the fixed contact 67 mounted on the framework 4 of the scale directly above the beam 12 whenever this arm of the beam is rocked upwardly, as by the placing of a load on the scale platform. The fixed contact 67 is electrically connected with one end of the coil of the solenoid 40, the other end thereof leading to the contact plate C (Fig. 10) which, as before described, connects with the source of current B. The leaf spring contact 65 is directly connected with the lower fixed contact 68 of an auxiliary switch comprising upper and lower fixed contacts 68 and 69 respectively adapted to be engaged by a movable contact 70 located centrally of the fixed contacts and carried upon a leaf spring arranged to throw the contact 70 into engagement with the upper fixed contact 69 unless otherwise retained. However, the central contact 70 is normally forced downwardly and held in engagement with the lower fixed contact 68 by a laterally extending arm 71ª on the upright arm 71 carried by the core 51 of the solenoid 41 attached to the carrier frame 52 (Figs. 2 and 10). The contacts 68, 69 and 70 are mounted upon an insulating plate 72 fixed on the framework of the scale adjacent the rear thereof (see Fig. 2). The central or flexibly-supported switch member 70 is electrically connected with the contact plate D, which, as before described, is also connected with the main switch A. It will be apparent, therefore, that with the main switch in closed position, the solenoid 40 will be energized whenever the upper beam contact 66 is moved into engagement with the fixed contact 67 due to the rocking of the scale beam 12, the circuit comprising the wires connecting the projection 64 and leaf spring contact 65 on the scale beam, the lower fixed contact 68, the flexible contact 70 and the wire leading therefrom to the contact plate D on the one side of the switch A and the wire connecting the solenoid 40 with the contact 67, the wire leading from the solenoid 40 to the contact plate C, and the wires connecting the batteries B with the contact plate C and main switch A. The solenoid 40 will remain energized as long as the switch member 66 remains in contact with the switch member 67—i. e., as long as the weight on the platform keeps that arm of the scale beam 12 in elevated position, the beam falling as soon as the weights 15 deposited on the scale pan 30 are sufficient to offset the weight of the load on the platform.

To return the weights 15 to their normal positions, the solenoid coil 41 must be energized, which is accomplished through the following connections. The lower beam contact 66ª (Fig. 10) rests upon the lower fixed contact 67ª whenever the weight suspended on the hanging counterpoise 14 exceeds the weight of the load upon the scale platform, the lower beam contact 66ª being electrically connected with the projection 64 and leaf spring contact 65 of the scale beam 12 and therefrom with the contact plate D and switch A by the same wires and connections hereinbefore described with relation to the upper beam contact 66, and the lower fixed contact 67ª being directly connected with the contact plate E, from which plate leads a wire connected with one end of the solenoid coil 41, the other end of this coil being connected with a wire leading to the contact plate C, which, as before described, connects with the source of current B and switch A. Thus, when the lower beam contact 66ª falls into engagement with the lower fixed contact 67ª a circuit is closed energizing the solenoid coil 41, raising the core 51 thereof and the carrier mechanism 52 to lift the weights 15 from the pan 30 of the hanging counterpoise and return them to their normal positions. As soon as the weights 15 are removed from the hanging counterpoise, the beam 12 again moves upwardly toward its normal horizontal position, breaking the engagement between the lower beam contact 66ª and the fixed contact 67ª. This disengagement of the contacts 66ª and 67ª would deënergize the solenoid 41 and allow the carrier 52 and weights 15 to again fall into their former positions were it not for the following connections, serving to maintain a circuit through the solenoid coil 41 to hold the weights 15 up until the supporting links 33 have been moved inwardly to engage the flanges of the weights 15 by the dropping of the arms 36. The energization of the solenoid coil 41 is maintained in this manner. As the carrier mechanism 52 moves upwardly, the arm 71ª carried thereby moves away from the central switch member 70, which, as before described, is flexibly mounted upon a leaf spring and is normally held in engagement with the lower contact 68 of the auxiliary switch. When the arm 71ˣ moves upwardly, the leaf spring throws the central switch member 70 upwardly into engagement with the upper fixed contact 69, which is electrically connected with the contact plate E (Fig. 10), with which plate the lower contact member 67ª was also connected. The severance of the contacts 66ª and 67ª takes place slightly after the closing of the contacts 70 and 69, so that the circuit will remain closed, though the wires leading from the plate E to the contact 69 will be substituted for the wires leading from said plate to the lower contact 67ª. As the core 51 of the solenoid 41 approaches the limit of its upward movement, the upright arm 71 carried thereby engages the lower movable member of the switch 73, closing said switch and completing a circuit through the solenoid 54, retracting the core of this solenoid to withdraw the pawl 57 from engagement with the ratchet teeth 58 on the segment 48, thereby releasing said segment 48 and the weight-depositing mechanism to return by gravity to their original positions, the cam-rods 36 during their falling movements sliding the supporting links 33 inwardly into position to support the loose weights 15. One member of the switch 73 (the lower as shown) is directly connected with the contact plate D, which is also connected with one post of the main switch A, and the other member of the switch 73 is connected with one end of the coil of the solenoid 54, the other end being connected with the contact plate C, which is also connected with the batteries B and the other post of the main switch A. After the supporting links 33 have been slid into normal position and the cam-rods 36 fallen to their lowermost position, the circuit energizing the solenoid 41 is broken by means of an arm 91, (Fig. 2) herein shown as carried by the link 43 of the weight-depositing mechanism, moving into engagement with the flexible switch member 70 and forcing the same away from the upper contact 69. The breaking of this circuit allows the carrier 52 and attached mechanism to fall by gravity to their original positions, the arm 71ª falling again into contact with the flexible switch member 70 and holding it in engagement with the lower fixed contact 68. The arm 91 carried by the weight-depositing mechanism is preferably provided with an adjustable contact screw 92, the lower end of which is adapted to be positioned so that it is spaced very slightly from the upper surface of the flexible switch member 70 when this switch member is in contact with the lower fixed contact 68 (i. e., in its normal position) but so that it will contact with the upper surface of said switch member when the latter is in contact with the upper fixed contact 69. Thus, when the weight-depositing mechanism returns from an elevated position to its original position and the flexibly mounted switch member 70 is in engagement with the upper fixed contact 69, the screw 92 will engage the upper surface of said switch member and carry it away from the upper fixed contact but will not carry it downwardly into engagement with the lower fixed contact, the flexible switch member remaining in a central position out of engagement with either contact until in the return of the carrier mechanism 52 to its original position, the lateral arm 71ª is lowered into engagement therewith.

The connections for actuating the printing mechanism are preferably made through a supplementary switch G. (Figs. 1 and 10). One post of this switch G is connected with the main switch A, thence continuing across the closed switch to the other post thereof, through the batteries B to the contact plate E. The other post of the supplementary or printing switch G is directly connected with one end of the coil forming the printing solenoid 87, the other end of which is connected with the contact plate E. Thus, whenever the supplementary switch G is closed, the printing solenoid 87 is actuated to retract its core 86 and swing the printing hammer 75 to effect an impression upon a suitable card or the like carried by the hammer, as hereinbefore described.

The operation of my improved scale is believed to be apparent from the foregoing description. When a commodity is placed upon the platform 9 of the scale, the scale beam 12 is rocked to swing the segmental pendulum 18 into an elevated position to offset the weight of the load on the platform. If the pendulum 18 is of greater load-offsetting capacity than the weight of the commodity being weighed the pendulum will counterbalance all of the weight of the load. The indication of the weight would then be given at the sight opening 23 in the indicating plate 24, the swinging movement of the pendulum in its load-offsetting function bringing the numeral corresponding to the weight of the load opposite the sight opening. The proper printing type corresponding to the weight of the load would similarly be positioned above the printing hammer 75, as hereinbefore described.

Should the weight of the load placed upon the platform exceed the load-offsetting capacity of the pendulum, the scale beam 12 will be rocked upwardly so as to bring the upper beam contact 66 into engagement with the upper fixed contact 67 completing a circuit to energize the solenoid as hereinbefore described, the core 42 of said solenoid being thereby retracted to raise the cam-rods 36 to deposit one or more of the loose weights 15 upon the hanging counterpoise 14 carried by the scale beam. The upward movement of the cam-rods 36 continues until sufficient weights 15 have been deposited on the counterpoise to swing the scale beam downwardly, separating the contacts 66 and 67. The segment 48 has been rocked simultaneously with the elevation of the cam-rods 36 to bring into position behind the sight opening 23$^a$ the numeral corresponding to the weight offset by the loose weights 15 deposited on the counterpoise pan. In the illustrated embodiment, each of the loose weights 15 has a counter-balancing capacity of 1 lb., so that if a load of, say 3 lbs., 4 ozs., were placed upon the scale platform, three of the weights 15 would be automatically deposited upon the counterpoise pan and the numeral 3 would be brought into alinement with the sight opening 23$^a$, the pendulum 18 being utilized to offset the fractional part of the pound remaining and rocked to a position bringing the numeral 4 (indicating ounces) into alinement with the sight opening 23. The printing type corresponding to the numerals displayed in the sight opening will also be rocked into position above the printing hammer 75, as hereinbefore described.

With the weight offset, and the scale beam 12 in balanced position, the weight of the commodity can be printed by inserting a card or the like upon the printing hammer 75 and closing the auxiliary or printing switch G, a circuit being then completed through the printing solenoid 87 to swing the card into engagement with the inking ribbon 76 and the type 75 on the segments 18 and 48, the proper type having been moved into position by the rocking of the segments 18 and 48, and the segment 48 being locked in its adjusted position by means of the pawl 57 engaging with the adjacent ratchet tooth 58.

When the commodity is removed from the scale platform, the weight suspended upon the counterpoise pan will rock the scale beam to bring the beam contact 66$^a$ into engagement with the lower fixed contact 67$^a$, completing a circuit through the solenoid 41, as hereinbefore described, thereby energizing said solenoid to retract its core 51 and the carrier mechanism 52 to elevate the weights 15 upon the counterpoise pan 30 to their original positions, retaining them in this elevated position until a circuit is formed through the solenoid 54 to release the pawl 57 from the ratchet teeth 58 on the segment 48, freeing said segment and the weight-depositing mechanism to allow same to fall to its normal position, the cam-rods 36 in their downward travel sliding the supporting links 33 into engagement with the weights 15 elevated by the carrier 52. As the weight-depositing mechanism reaches its lowermost position the arm 91 thereon is brought into engagement with the flexibly mounted switch member 70, moving said member away from the fixed contact 69 and breaking the circuit energizing the solenoid 41, as hereinbefore described, the carrier mechanism 52 and connected elements thereupon falling by gravity to their original positions.

While it will be apparent that the illustrated embodiment of my invention herein disclosed is well adapted to adequately fulfill the objects of the invention primarily stated, it is to be understood that many other forms and structures may be employed, this invention being susceptible to modification, variation, and change without departing from the spirit and scope of the subjoined claims.

Having described my invention, I claim:

1. In a pendulum scale, a pendulum comprising a segment suspended below its fulcrum pivot and having printing type thereon arranged to form a portion of its effective weight, and means for adjusting the effective weight of the pendulum.

2. In a pendulum scale, a pendulum comprising a segment suspended below its fulcrum pivot and having printing type thereon arranged to form a portion of its effective weight, and a weight radially adjustable on said segment for adjusting the effective weight thereof.

3. In a pendulum scale, a pendulum comprising a normally pendent segment having printing type thereon and a radially movable adjustable counterbalance for adjusting the effective weight thereof.

4. In a pendulum scale, a pendulum comprising a pivot, a segment suspended below its fulcrum pivot and having printing type and an adjustable counterbalance arranged above the pivot for varying the effective weight of the pendulum.

5. In a pendulum scale, a pendulum formed of a pendant weighted segment having printing type thereon, and electrically-actuated means for effecting an impression from said printing type.

6. In a pendulum scale, a frame, a pendulum comprising a segment having printing type thereon, means for effecting an impression from said printing type, and means carried by said frame for relieving the pendulum from shock during the printing impression.

7. In a pendulum scale, a frame, a pendulum mounted on the frame and comprising a skeleton segment having printing type on its periphery, means for effecting an impression from said printing type, and means for relieving the pendulum from shock during the printing impression, comprising a post carried by the frame and extending into position closely adjacent to the periphery of the segment.

8. In a scale, a platform, platform supporting levers, a pendulum connected with said levers and carrying weight indicating numerals thereon, a counterpoise pan connected with said levers, auxiliary weights adapted to be deposited upon the counterpoise pan, electrically-actuated means for depositing the auxiliary weights upon the counterpoise pan, and means for indicating the capacity of the auxiliary weights deposited arranged in juxtaposition to the indicating numerals on said pendulum.

9. In a scale, a platform, platform supporting levers, a pendulum connected with said levers and carrying weight indicating numerals thereon, a counterpoise pan connected with said levers, auxiliary weights adapted to be deposited upon the counterpoise pan, electrically-actuated means for depositing the auxiliary weights upon the counterpoise pan, and electrically-actuated means for indicating the capacity of the auxiliary weights deposited.

10. In a scale, a platform, platform supporting levers, a pendulum connected with said levers and comprising a segment carrying printing type and indicating numerals thereon, a counterpoise pan connected with said levers, auxiliary weights adapted to be deposited upon the counterpoise pan, means for depositing said auxiliary weights, and a segment arranged in juxtaposition to said pendulum carrying printing type and indicating numerals thereon adapted to be moved in accordance with the capacity of the auxiliary weights deposited.

11. In a scale, a platform, platform supporting levers, a pendulum connected with said levers and comprising a segment carrying printing type and indicating numerals thereon, a counterpoise pan connected with said levers, auxiliary weights adapted to be deposited upon the counterpoise pan, means for automatically depositing said auxiliary weights, and a segment arranged in juxtaposition to said pendulum carrying printing type and indicating numerals thereon adapted to be moved in accordance with the capacity of the auxiliary weights deposited.

12. In a scale, a platform, platform supporting levers, a pendulum connected with said levers and comprising a segment carrying printing type and indicating numerals thereon, a counterpoise pan connected with said levers, auxiliary weights adapted to be deposited upon the counterpoise pan, electrically-actuated means for depositing said auxiliary weights, and a segment arranged in juxtaposition to said pendulum carrying printing type and indicating numerals thereon adapted to be moved in accordance with the capacity of the auxiliary weights deposited.

13. In a scale, a platform, platform supporting levers, a pendulum connected with said levers and comprising a segment carrying printing type and indicating numerals thereon, a counterpoise pan connected with said levers, auxiliary weights adapted to be deposited upon the counterpoise pan, electrically-actuated means for depositing said auxiliary weights, a segment arranged in juxtaposition to said pendulum carrying printing type and indicating numerals thereon adapted to be moved in accordance with the capacity of the auxiliary weights deposited, and electrically-actuated means for moving said segment.

14. In a scale, a platform, platform supporting levers, a pendulum connected with said levers and comprising a segment carrying printing type and indicating numerals thereon, a counterpoise pan connected with said levers, auxiliary weights adapted to be deposited upon the counterpoise pan, means for depositing said auxiliary weights, a segment arranged in juxtaposition to said pendulum carrying printing type and indicating numerals thereon adapted to be moved in accordance with the capacity of the auxiliary weights deposited, and means for effecting an impression from the printing type upon the segment and pendulum.

15. In a scale, a platform, platform supporting levers, a pendulum connected with said levers and comprising a segment carrying printing type and indicating numerals thereon, a counterpoise pan connected with said levers, auxiliary weights adapted to be deposited upon the counterpoise pan, means for depositing said auxiliary weights, a segment arranged in juxtaposition to said pendulum carrying printing type and indicating numerals thereon adapted to be moved in accordance with the capacity of the auxiliary weights deposited, means for locking said segment, and means for effecting an impression from the printing type upon the segment and pendulum.

16. In a scale, a platform, platform supporting levers, a pendulum connected with said levers and comprising a segment carrying printing type and indicating numerals thereon, a counterpoise pan connected with said levers, auxiliary weights adapted to be deposited upon the counterpoise pan, means for depositing said auxiliary weights, a segment arranged in juxtaposition to said pendulum carrying printing type and indicating numerals thereon adapted to be moved in accordance with the capacity of the auxiliary weights deposited, and electrically-actuated means for effecting an impression from the printing type upon the segment and pendulum.

17. In a scale, a platform, platform-supporting levers, a counterpoise pan connected with said levers, counterpoise weights adapted to be deposited upon the counterpoise pan, means for depositing said counterpoise weights, means for indicating the capacity of the weights deposited, comprising a segment carrying indicating numerals and printing type thereon, automatic means for locking the segment in adjusted position when said counterpoise weights are deposited, means for effecting an impression from said printing type, and means for releasing said segment when said counterpoise weights are removed from said pan.

18. In a scale, a platform, platform-supporting levers, a counterpoise pan connected with said levers, counterpoise weights adapted to be deposited upon the counterpoise pan, electrically-actuated means for depositing said counterpoise weights, means for indicating the capacity of the weights deposited, comprising a segment carrying numerals and printing type thereon, automatic means for locking the segment in adjusted position when said counterpoise weights are deposited, electrically-actuated means for effecting an impression from said printing type, and means for releasing said segment when said counterpoise weights are removed from said pan.

19. In a scale, a platform, platform supporting levers, a counterpoise pan connected with said levers, counterpoise weights adapted to be deposited upon the counterpoise pan, supports for said weights above the counterpoise pan, and means for depositing said weights comprising a solenoid, a vertically movable frame arranged to be moved thereby and contacting with the weight supports, and means for energizing the solenoid.

20. In a scale, a platform, platform supporting levers, a scale beam connected with said levers, a counterpoise pan carried by the scale beam, counterpoise weights adapted to be deposited upon the counterpoise pan, supports for said weights above the counterpoise pan, and means for depositing said weights comprising a solenoid, a vertically movable frame arranged to be moved thereby and contacting with the weight supports, and means for energizing the solenoid.

21. In a scale, a platform, platform supporting levers, a counterpoise pan connected with the levers, counterpoise weights adapted to be deposited upon the counterpoise pan, supports for normally holding the counterpoise weights above the counterpoise pan, and means for depositing the counterpoise weights, comprising a vertically movable frame having a cam slot therein adapted to engage and move said supports.

22. In a scale, a platform, platform supporting levers, a counterpoise pan connected with the levers, counterpoise weights adapted to be deposited upon the counterpoise pan, laterally movable supports for normally holding the counterpoise weights above the counterpoise pan, and means for depositing the counterpoise weights, comprising a vertically movable frame having a cam slot therein adapted to engage and laterally move said supports.

23. In a scale, a platform, platform supporting levers, a counterpoise pan connected with the levers, counterpoise weights adapted to be deposited upon the counterpoise pan, laterally movable supports adapted to normally support the counterpoise weights above the counterpoise pan and having spaced side pieces connected by a crossbar, and means for depositing the counterpoise weights, comprising a vertically movable frame having a cam slot therein adapted to engage the crossbars of said supports and move said supports laterally.

24. In a scale, a platform, platform supporting levers, a scale beam connected with said levers, a counterpoise pan suspended from the scale beam, a plurality of counterpoise weights normally supported above the counterpoise pan, means for normally supporting the counterpoise weights, comprising a frame having guide apertures therein, a plurality of laterally movable weight supports formed with spaced side pieces mounted in said apertures and connected by crossbars, and means for depositing the weights on said counterpoise pan comprising a vertically movable frame having a cam slot therein adapted to engage the crossbars and move said supports laterally.

25. In a scale, a platform, platform supporting levers, a scale beam connected with said levers, a counterpoise pan suspended from the scale beam, a plurality of flanged counterpoise weights normally supported above the counterpoise pan, means for normally supporting the counterpoise weights comprising a frame having guide apertures therein, a plurality of laterally movable weight supports formed with spaced side pieces mounted in said apertures and connected by crossbars, said supports being arranged in oppositely-disposed pairs, the inner extremities of each pair engaging under a flanged weight, and means for depositing the weights on said counterpoise pan comprising a vertically movable frame having a cam slot therein adapted to engage the crossbars and move said supports laterally.

26. In a scale, a platform, platform supporting levers, a scale beam connected with said levers, a counterpoise pan suspended from the scale beam, a plurality of counterpoise weights normally supported above the counterpoise pan, means for normally supporting the counterpoise weights comprising a frame having guide apertures therein, a plurality of laterally movable weight supports formed with spaced side pieces mounted in said apertures and connected by crossbars, means for depositing the weights on said counterpoise pan comprising a vertically movable frame having a cam slot therein adapted to engage the crossbars and move said supports laterally, and electrically-actuated means for raising said frame.

27. In a scale, a platform, platform supporting levers, a counterpoise pan connected with said levers, a series of counterpoise weights normally supported above the counterpoise pan, means for normally supporting the counterpoise weights comprising oppositely-disposed pairs of laterally movable supports, and means actuated upon movement of the levers to laterally move said supports to deposit said weights on said counterpoise pan.

28. In a scale, a platform, platform supporting levers, a scale beam connected with said levers, a counterpoise pan suspended from the scale beam, a series of counterpoise weights normally supported above the counterpoise pan, means for normally supporting the counterpoise weights comprising oppositely-disposed pairs of laterally movable supports, and means actuated upon movement of the scale beam to laterally move said supports to deposit said weights on said counterpoise pan.

29. In a scale, a platform, platform-supporting levers, a scale beam connected with said levers, a counterpoise pan suspended from the scale beam, a series of counterpoise weights, laterally-movable supports normally supporting said weights above the counterpoise pan, electrically-actuated means, including a solenoid under control of the movement of the scale beam, for moving said supports to deposit said weights upon the counterpoise pan, and electrically-actuated means for returning said weights to their normal positions.

30. In a scale, a platform, platform-supporting levers, a scale beam connected with said levers, a counterpoise pan suspended from the scale beam, a series of counterpoise weights, laterally-movable supports normally supporting said weights above the counterpoise pan, electrically-actuated means, including a solenoid under control of the movement of the scale beam, for moving said supports to deposit said weights upon the counterpoise pan, and electrically-actuated means controlled by the scale beam for returning said weights to their normal positions.

31. In a scale, a platform, platform-supporting levers, a scale beam connected with said levers, a counterpoise pan suspended from the scale beam, a series of counterpoise weights, laterally-movable supports normally supporting said weights above the counterpoise pan, electrically-actuated means, including a solenoid under control of the movement of the scale, for moving said supports to deposit said weights upon the counterpoise pan, indicating means, printing mechanism actuated in accordance with the weight-depositing means, and electrically-actuated means controlled by the scale beam for returning said weights to their normal positions.

32. In a scale, a platform, platform supporting levers, a scale beam connected with said levers, a counterpoise pan suspended from the scale beam, a series of counterpoise weights normally supported above the counterpoise pan, electrically-actuated means for depositing said weights upon the counterpoise pan comprising a solenoid having a core, a frame connected with said core and movable into and out of contact with said supports, and means for energizing said solenoid.

33. In a scale, a platform, platform supporting levers, a scale beam connected with said levers, a counterpoise pan suspended from the scale beam, a series of counterpoise weights normally supported above the counterpoise pan, electrically-actuated means for depositing said weights upon the counterpoise pan comprising a solenoid having a core, a frame connected with said core and movable into and out of contact with said supports, and means governed by the movement of the scale beam for energizing said solenoid.

34. In a scale, a platform, platform supporting levers, a scale beam connected with said levers, a counterpoise pan suspended from the scale beam, a series of counterpoise weights normally supported above the counterpoise pan, electrically-actuated means for depositing said weights upon the counterpoise pan comprising a solenoid having a core, a frame connected with said core and movable into and out of contact with said supports, means governed by the movement of the scale beam for energizing said solenoid, and electrically-actuated means for returning the weights to their normal positions, comprising a solenoid having a core, a frame connected with said core, and means under the control of the scale beam for energizing said solenoid.

35. In a scale, a platform, platform supporting levers, a scale beam connected with said levers, a counterpoise pan suspended from the scale beam, a series of counterpoise weights of greater diameter than the counterpoise pan normally supported above the counterpoise pan, electrically-actuated means for depositing said weights upon the counterpoise pan comprising a solenoid having a core, a frame connected with said core and carrying a ring of greater diameter than said counterpoise pan but of lesser diameter than the counterpoise weights, means governed by the movement of the scale beam for energizing said solenoid, and electrically-actuated means for returning the weights to their normal positions, comprising a solenoid having a core, a frame connected with said core, and means under the control of the scale beam for energizing said solenoid.

36. In a scale, a pair of segments carrying printing type thereon, means for independently moving said segments according to the weight upon the scale, electrically-actuated means for effecting an impression from said printing type, comprising a solenoid having a core, a platen connected with said core and arranged adjacent said type, means for energizing said solenoid, and electrically-actuated means for moving said platen.

37. In a scale, a pair of segments carrying printing type thereon, means for independently moving said segments, electrically-actuated means for effecting an impression from said printing type, comprising a solenoid having a core, a platen pivotally mounted adjacent the type, a slotted arm connected with said platen, a pin carried by said core and extending into engagement with said slotted arm, and means for energizing said solenoid.

38. In a scale, a scale beam, electrically-actuated weight-depositing means including a solenoid having a core, means governed by the scale beam for energizing said solenoid, and means for cushioning the movement of the core comprising a cylinder formed within the core, a restricted outlet for said cylinder, and a piston head fixed on said core.

39. In a scale, a scale beam, electrically-actuated weight-depositing means including a solenoid having a core, means governed by the scale beam for energizing said solenoid, and means for cushioning the movement of the core comprising a cylinder formed within the core, a valve for regulating the admission of fluid to and from said cylinder, and a piston head fixed on said core.

ELMER C. POOL.

Witnesses:
MONT L. AILEY,
ANNA ZEIGLER.